United States Patent [19]

Allen et al.

[11] Patent Number: 5,128,073

[45] Date of Patent: Jul. 7, 1992

[54] EXPANDING THERMOPLASTIC RESIN BEADS WITH VERY HIGH FREQUENCY ENERGY

[75] Inventors: Richard B. Allen, Hinsdale, Mass.; Bang M. Kim, Schenectady; David S. Miller, III, Chatham, both of N.Y.

[73] Assignee: General Electric Company, Selkirk, N.Y.

[21] Appl. No.: 427,871

[22] Filed: Oct. 26, 1989

[51] Int. Cl.$^5$ ............................................. C08J 9/24
[52] U.S. Cl. ................................... 264/26; 264/45.4; 264/53; 521/57
[58] Field of Search ................ 264/26, 53, 45.4; 521/55, 89, 98, 57

[56] References Cited

U.S. PATENT DOCUMENTS

| | | | |
|---|---|---|---|
| 3,242,238 | 3/1966 | Edberg et al. | 264/26 |
| 3,848,038 | 11/1974 | Dench | 264/51 |
| 4,234,636 | 11/1980 | Thorsrud et al. | 428/95 |
| 4,306,034 | 12/1981 | Thorsrud | 521/95 |
| 4,400,483 | 8/1983 | Siedenstrang et al. | 524/247 |
| 4,765,934 | 8/1988 | Nazar et al. | 264/26 |

FOREIGN PATENT DOCUMENTS 2230667 12/1974 France .
918329 2/1963 United Kingdom .

OTHER PUBLICATIONS

H. F. Schwartz et al., Chem. Abs. 97027b, Microwave Curing of Synthetic Rubbers, vol. 80, 1974.

Primary Examiner—David A. Simmons
Assistant Examiner—Thi Dang
Attorney, Agent, or Firm—Hedman, Gibson & Costigan

[57] ABSTRACT

Expandable thermoplastic resin beads coated with a novel very high frequency energy absorbing material are expanded with microwave energy.

52 Claims, No Drawings

EXPANDING THERMOPLASTIC RESIN BEADS WITH VERY HIGH FREQUENCY ENERGY

The present invention relates to a novel process for expanding thermoplastic resin beads with very high frequency energy and the novel foamed articles made by the process.

BACKGROUND OF THE INVENTION

The art of making integral low density cellular polymeric structures having uniform small voids from expandable polymeric materials is well established. Thermoplastic foam products are generally formed by processing tiny beads or spherical particles of a thermoplastic resin impregnated with an expanding agent. The particles expand when exposed to heat, thereby forming a foam structure.

Various means have been suggested for heating the beads to cause them to expand into a foamed structure. Hot water has been used, but such treatment is limited in its commercial application to situations wherein the material is foamed in molds, or other applications where it is not prepared in situ with materials of various types which would not stand exposure to water. The hot water technique is also limited with respect to time, sometimes requiring several hours to produce the foamed structure.

Infrared rays have also been used for expansion of thermoplastic resin beads. The tendency in this method is to overheat one side of the bead, thereby causing collapse of the foamed structure and increased density, the heated side having a high density and the unheated side having a low density. Difficulties are also encountered when an effort is made to form the foamed structure in situ using infrared heat.

Steam has also been extensively used to promote the expansion of beads. However, the use of steam is limited by the maximum temperature achievable by the steam available. Because of these limitations steam is not an efficient heat source for processing transition temperature. Additionally, the use of steam presents the difficulties of entrained steam in the products and the reaction of steam with polymers.

It has been proposed that other methods of heating the polymeric beads be employed.

Edberg, et al., U.S. Pat. No. 3,242,238, disclose treating or covering polymer beads with an aqueous solution of a wetting agent and then exposing the beads to dielectric heating, i.e. a high frequency heating unit operating at about 70 megacycles per second. However no teaching of employing very high frequency energy to heat such beads or of the novel very high frequency energy absorbing organic materials is disclosed.

Nazar, et al., U.S. Pat. No. 4,765,934 disclose uniformly distributing a water soluble salt over the surface of polystyrene beads and applying microwave energy to effect foaming. The patentees, however, do not teach employing very high frequency energy absorbing organic materials.

It has now surprisingly been discovered that expandable thermoplastic resin beads coated with a very high frequency energy absorbing organic material or its water solution or organic material coated on a substrate produce excellent foamed articles. Application of very high frequency energy to the coated beads of the present invention provides rapid heating and expansion and is amenable to beads comprising engineering plastics having a high glass transition temperature.

Also to be mentioned are Dench, U.S. Pat. No. 3,848,038 describing drying thermoplastic resins with microwave energy and Thorsrud et al., U.S. Pat. No. 3,234,636 describing employing microwave energy in a flow molding process.

SUMMARY OF THE INVENTION

According to the present invention there is provided a process for producing a foamed thermoplastic resin article comprising: (a) providing a thermoplastic resin in particulate form impregnated with a blowing agent; (b) coating the particulate thermoplastic resin with an effective amount of a very high frequency energy absorbing organic material or its water solution or organic material coated on a substrate; (c) delivering the coated material to a very high frequency energy transparent vessel; and (d) expanding the coated particles with very high frequency energy sufficient to fuse the coated particles. It is also contemplated to pre-expand the thermoplastic particles in step (a) with a heat source.

Also according to the present invention there are provided foamed articles produced by the process of the present invention.

DETAILED DESCRIPTION OF THE PRESENT INVENTION

The present invention relates to a process for producing foamed thermoplastic resin articles. The invention may be practiced with the use of a wide variety of materials encompassed within the broader description given above. In the typical case, however, use is made of certain preferred materials which are described below.

The polyphenylene ether (PPE) is normally a homo- or copolymer having units of the formula

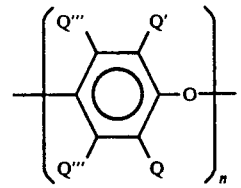

wherein Q, Q', Q'', Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether can be prepared in accordance with known procedures such as those described in Hay, U.S. Pat. Nos. 3,306,874 and 3,306,875; and Stamatoff, U.S. Pat. Nos. 3,257,357 and 3,257,358, from the reaction of phenols including but not limited to: 2,6-dimethylphenol; 2,6-diethylphenol; 2,6-dibutylphenol; 2,6-diaurylphenol; 2,6-dipropylphenol; 2,6-diphenylphenol; 2-methyl-6-tolylphenol; 2-methyl-6-methoxyphenol; 2,3,6-trimethylphenol; 2,3,5,6-tetramethylphenol; nd 2,6-diethyoxyphenol.

Each of these may be reacted alone to produce the corresponding homopolymer, or in pairs or with still other phenols to produce the corresponding copolymer. Examples of the homopolymer include poly(2,6-dimethyl-1,4-phenylene)ether, poly(2,6-diethyl-1,4- phenylene)ether, poly(2,6-dibutyl-1,4-phenylene)ether, poly(2,6-diauryl-1,4-phenylene)ether, poly(2,6-dipropyl-1,4-phenylene)ether, poly(2,6-diphenyl-1,4-phenylene)ether, poly(2-methyl-6-butyl-1,4-phenylene)ether, poly(2,6-dimethoxy-1,4-phenylene)ether, poly(2,3,6-trimethyl-1,4-phenylene)ether, poly(2,3,5,6-tetramethyl-1,4-phenylene)ether, and poly(2,6-diethyoxy-1,4-phenylene)ether. Examples of the copolymer include, especially those of 2,6-dimethylphenol with other phenols, such as poly(2,6-dimethyl-co-2,3,6-trimethyl-1,4-phenylene)ether and poly(2,6-dimethyl-co-2-methyl-6-butyl-1,4-phenylene)ether.

For purposes of the present invention, an especially preferred family of polyphenylene ethers include those having alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly (2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene) ether; and the like.

The most preferred polyphenylene ether resin for purposes of the present invention is poly(2,6-dimethyl-1,4-phenylene)ether.

The term "alkenyl aromatic polymer" as it is employed in this disclosure is intended to encompass homopolymers, as well as rubber modified high impact varieties, and also copolymers and terpolymers of alkenyl aromatic compounds with one or more other materials. Preferably, the alkenyl aromatic polymer is based at least in part on units of the formula

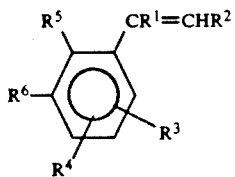

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms; or $R^5$ and $R^6$ may be concatenated together with hydrocarbyl groups to form a naphthyl group.

The above will encompass styrene, as well as homologs and analogs of styrene. Specific examples include in addition to styrene, chlorostyrene, dichlorostyrene, bromostyrene, dibromostyrene, alpha-methyl styrene, nuclear-methyl styrene, para-methyl styrene, para-tert-butyl styrene, vinyl styrene, divinyl benzene and vinyl naphthalene. Styrene is especially preferred.

By way of illustration, the polystyrene (PS) component can be a homopolystyrene (principally atactic) or other alkenyl aromatic homopolymer which has been modified by admixture or interreaction with a natural or synthetic rubber, for example, polybutadiene, polyisoprene, EPDM rubber or silicone rubber; or it can be a copolymer or terpolymer of styrene or other alkenyl aromatic compound with an elastomeric or other material, such as block copolymers of styrene and butadiene (for example, AB, ABA, ABAB or ABABA type), including hydrogenated forms of the foregoing, a radial teleblock copolymer of styrene, butadiene and a coupling agent, including hydrogenated forms, terpolymers of acrylonitrile, styrene and butadiene (ABS), styrene-acrylonitrile copolymers (SAN), and a copolymer of styrene and maleic anhydride (SMA); or it can also be an alkenyl aromatic copolymer or terpolymer which has been modified with rubber, for example, rubber modified styrene-maleic anhydride copolymer. Many of these are described in the patent literature, such as Cizek, U.S. Pat. No. 3,383,435.

The polyphenylene ether (PPE) and polystyrene resins may be combined in a conventional manner. PPE resin will typically be in powder or pellet form and the polystyrene will typically be in pellet form. The resins may be combined by dry blending in a blender which provides a relatively uniform mixture of the resins or by other conventional means. This mixture is typically directed to a thermoplastic extruder, usually of the single or twin screw type, where in the case of a blend the resin is compounded with sufficient temperature and shear to provide an intimate PPE/PS blend.

The product of the conventional extruder is an extrudate in the form of strands which may be quenched with a coolant such as cooling water. The cooled strands are directed to a pelletizer device which provides the PPE/PS resin pellets in a conventional form for use in the present invention.

During the blending step it is contemplated that conventional additives may be incorporated in the resin mixture if desired. These include rubbery impact modifiers, flame retarding agents, stabilizers for thermal and color stability, antioxidants, processing aids, plasticizers, reinforcing and extending fillers, pigments, antistatic agents, lubricants, mixtures of any of the foregoing and the like. Each of these may be utilized to a greater or lesser degree depending on the final required properties desired in the foamed product.

Conventional surfactants and nucleants used in expanded polystyrene foams may also be utilized. Examples of these include zinc or tin stearates, maleates, fumarates, talc, a citric acid and sodium bicarbonate mixture (Hydrocerol ®) and the like.

It is also contemplated in the present invention to employ a variety of other thermoplastic resins.

Polycarbonate resins, suitable for use in this invention, can comprise non-aromatic as well as aromatic forms. With respect to aromatic polycarbonate resins, these can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

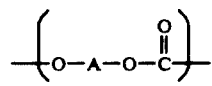

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis-(4-hydroxyphenyl)propane; 2,2-bis-(3,5-dimethyl-4-hydroxyphenyl) propane; 4,4'-di-hydroxydiphenyl ether; bis(2-hydroxyphenyl)methane, mixtures thereof and the like. The preferred aromatic carbonate polymer for component (ii) is a homopolymer derived from 2,2-bis(4-hydroxyphenyl) propane(bisphenol-A).

Poly(ester carbonates) for use in the invention are known and can be obtained commercially. Generally, they are copolyesters comprising recurring carbonate groups

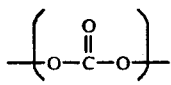

carboxylate groups

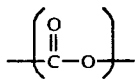

and aromatic carbocyclic groups in the linear polymer chain, in which at least some of the carboxylate groups and at least some of the carbonate groups are bonded directly to ring carbon atoms of the aromatic carbocyclic groups. These poly(ester carbonates) in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate precursor, of the types described above. A particularly useful poly(ester carbonate) is derived from bisphenol-A, isophthalic acid, terephthalic acid, or a mixture of isophthalic acid and terephthalic acid, or the reactive derivatives of these acids such as terephthaloyl dichloride, or a mixture thereof, and phosgene. The molar proportions of dihydroxy diaryl units can range from 1:0.30–0.80:0.70–0.20 and the molar range of terephthalate units to isophthalate units can range from 9:1 to 2:8 in this preferred family of resins.

The aromatic dihydric phenol sulfone polymer resins useful herein are a family of resins which can be made by those skilled in this art. For example homopolymers of dihydric phenol, and a dihydroxydiphenyl sulfone and a carbonate precursor can be prepared as well as copolymers of a dihydric phenol and a carbonate precursor can be made according to the description in Schnell et al., U.S. Pat. No. 3,271,367. A preferred material is made by polymerizing bis-(3,5-dimethyl-4-hydroxyphenyl) sulfone, alone, or especially in combination with bipshenol-A with phosgene or a phsogene precursor, in accordance with the description in Fox, U.S. Pat. No. 3,737,409. Especially preferred is a copolymer made by reacting 40 to 99 weight percent of the sulfone, 1 to 60 weight percent of the bisphenol with phosgene.

Polyesters suitable for use herein may be saturated or unsaturated or polyester elastomers and are generally derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

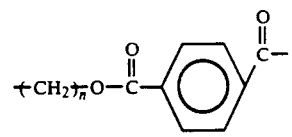

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid as to produce a polyester having recurring units of the following formula:

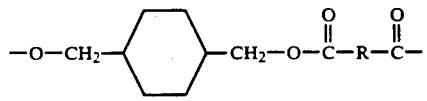

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl) ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

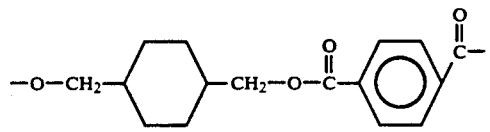

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

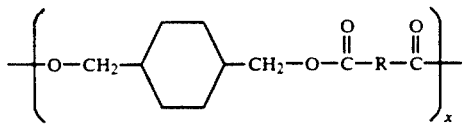

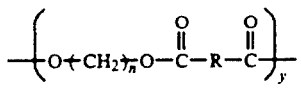

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

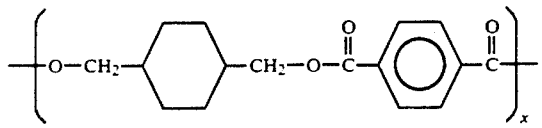

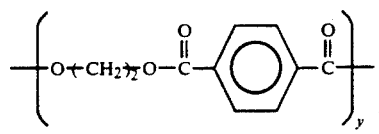

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°-30° C.

The olefinic polymers contemplated for use in the compositions of the present invention are essentially non-elastomeric, non-rubbery, thermoplastic (that is, in the absence of a heat activated crosslinking agent) polymers usually containing at least some crystalline domains. In general, the olefinic polymer, which can be a homopolymer or copolymer, is derived from 1 or more olefins having from 2 to 10 carbon atoms, that is $C_2$ to $C_{10}$ olefins. Most preferred are polyethylene, and polypropylene.

Methods for their preparation are well known. A useful reference is the Encyclopedia of Polymer Science and Technology, John Wiley and Sons, Inc. (1965-1969). The pertinent sections are set forth in Volume 6, pages 275-286 and 332-338 (polyethylene homopolymers); Volume 6, pages 338-347 (polyethylene copolymers); Volume 11, pages 597-606 (polypropylene); Volume 2, pages 759-761 (polybutylene); and Volume 9, pages 440-449 (polymers derived from higher olefins, such as 3-methyl-1-butene; 1-pentene; 4-methyl-1-pentene and 1-hexane).

Polyolefins derived from the lower olefins, especially, are readily available. Commercial processes for the production of polyethylene in particular include the use of high pressure by free radical initiation, medium pressure with transition metal oxide catalysts, and low and medium pressure processes with transition metal halides and alkyl aluminum compounds. Polyethylenes of still higher molecular weight may be produced by the well known Phillips process. Polypropylene is typically manufactured with the use of Ziegler type catalysts and an anionic reaction mechanism. Polyolefins derived from any of these sources may be used in the practice of the present invention.

The polyamides are a known family of polymeric condensation products containing recurring aromatic or aliphatic amide groups as integral parts of the main polymeric chain (such polymers are sometimes referred to as "nylons"). In general, the polyamides useful in the practice of this invention are those having linkages of the formula

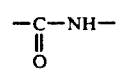

in the main chain. These include polymers formed from the condensation of diamines and dibasic acids, from the condensation of amino acids, and by the polymerization of lactams.

In general, the polyamides are obtained by polymerizing a monoaminocarboxylic acid or internal lactam thereof having at least two carbon atoms between the amines and carboxylic acid groups; or by polymerizing substantially equimolar proportions of a diamine which contains at least two carbon atoms between the amino groups and a dicarboxylic acid; or by polymerizing a monoamino carboxylic acid or an internal lactam thereof together with substantially equimolar proportions of a diamine and a dicarboxylic acid. Examples of the monoamino-carboxylic acid or lactam include compounds containing from 2 to 16 carbon atoms between the amino and carboxylic acid groups (the carbon atoms forming a ring with the amide group in the case of a lactam). As particular examples, mention is made of aminocaprioic acid, butyrolactam, picalolactam, caprolactam, caprylactam, enantholactam, undecanolactom, dodecanolactam and 3-, and 3-aminobenzoic acids.

Examples of the diamine are those of the general formula $H_2N(CH_2)_nNH_2$, in which n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g., 2,2-dimethylpentamethylenediamine and 2,2,4- and 2,4,4-trimethylhexamethylenediamine, are further examples. Other diamines which may be mentioned as examples are aromatic diamines, e.g., p-phenylenediamine, 4,4'-diaminodiphenyl sulfone, 4,4'-diaminodiphenyl ether and 4,4'-diaminodicyclohexylmethane.

The dicarboxylic acids may be aromatic, for example, isophthalic and terephthalic cids. Preferred dicarboxylic acids are of the formula HOOC-Y-COOH wherein Y represents a divalent aliphatic radical containing at least 2 carbon atoms. Examples of such acids are sebacic acid, octadecanedioic acid, suberic acid, azelaic acid, undecanedioic acid, glutaric acid, pimelic acid, and especially adipic acid.

Illustratively the following polyamides may be incorporated into the thermoplastic resin blends of the invention:

Homopolymers polyhexamethylene adipamide (nylon 6,6));
polypyrrolidone (nylon 4);
polycaprolactam (nylon 6);
polyheptolactam (nylon 7);
polycaprylactam (nylon 8);
polynonanolactam (nylon 9);
polyundecanolactam (nylon 11);
polydodecanolactam (nylon 12);
polyhexamethylene azelaiamide (nylon 6,9);
polyhexamethylene sebecamide (nylon 6,10);
polyhexamethylene isophthalamide (nylon 6,ip);
polymethaxylylene adipamide (nylon MSD,6);
polyamide of hexamethylene and n-dodecanedioic acid (nylon 6,12); and
polyamide of dodecamethylene and n-dodecanedioic acid (nylon 12,12);

Copolymers hexamethylene adipamide/caprolactam (nylon 6,6/6);
hexamethylene adipamide/hexamethylene isophthalamide (nylon 6,6/6,ip);
hexamethylene adipamide/hexamethylene terephthalamide (nylon 6,6/6,tp);
trimethylhexamethylene oxamide/hexamethylene oxamide (nylon trimethyl-6,2/6,2);
hexamethylene adipamide/hexamethylene azelaiamide (nylon 6,6/6,9); and
hexamethylene adipamide/hexamethylene azelaimide caprolactam (nylon 6,6/6,9/6); and
hexamethylene adipamide/hexamethylene azelaiamide caprolactam (nylon 6,6/6,9/6).

The average molecular weight of the polyamide used in the compositions of this invention can range from about 1,000 to about 20,000 or higher (number average).

Special mention is made herein of the preferred polyamides known as nylon 6 (a polycaprolactam) and nylon 6,6 (a polyhexamethylene adipamide).

Polyetherimide resins are amorphous high performance thermoplastics. Polyetherimide resins have a chemical structure based on repeating aromatic imide and ether units and are generally of the formula:

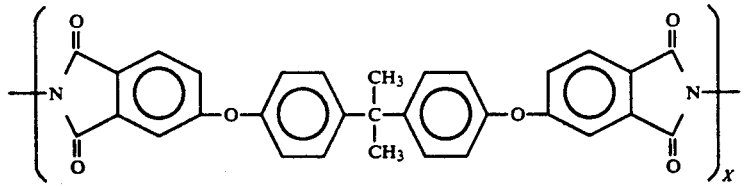

The polyetherimide resins are available commercially, e.g. Ultem ® from General Electric Company, and are described more fully in the literature. (See Modern Plastics Encyclopedia, '89, McGraw Hill, October 1988, Vol. 65, No. 11, P. 50.

Other preferred resins contemplated for use in the present invention are poly(etherimide esters) and polyethersulfones. These are available commercially and are fully described in the literature.

The thermoplastic resin is generally supplied in particulate form or it may be placed in a melt compounder such as an extruder and delivered to a pelletizing device to provide the resin in particulate form. The resin is then impregnated with a blowing agent. Any method known to those skilled in the art may be employed to impregnate the thermoplastic resin with the blowing agent, including but not limited to adding the blowing agent to the resin in an extruder or adding blowing agent during the polymerization process or employing a method whereby the blowing agent is diffused into the particulate thermoplastic resin. Conventional surfactants and nucleants used in expanded polystyrene foams may also be utilized. Examples of these include zinc or tin stearates, maleates, fumarates, talc, a citric acid and sodium bicarbonate mixture (Hydrocerol ®) and the like.

The blowing agents which may be utilized in the practice of this invention are volatile liquids or gases which can be absorbed into the polymer mixture and which will vaporize at a temperature below the Tg of the resin matrix. PPE/PS blends typically have a Tg in excess of 100° C. The Tg of such blends increases roughly 10° C. for each 10 weight percent PPE in the resin blend, up to the Tg of PPE (approximately 210° C.). Thus a 30:70 mixture of PPE/PS has a Tg of approximately 125° C. and the Tg of a 50:50 blend is approximately 145°-155° C. Note that these temperatures are for blends prior to the addition of the blowing agent.

The blowing agents may include conventional hydrocarbon or fluorocarbon blowing agents. The preferred hydrocarbon blowing agents will include aliphatic hydrocarbons. Examples include propane, butane, isobutane, n-pentane, isopentane, neopentane, pentene, cyclopentane, hexane, heptane, octane, mixtures thereof and the like. Fluorocarbon blowing agents include trichlorofluoromethane ($CCl_3F$.), dichlorodifluoromethane ($CCl_2F_2$), difluorochloromethane (HCFC-22) ($CHClF_2$) and $CClF_2$-$CClF_2$. These are commercially available as FREON ® 11, FREON ® 12, FORMACEL ®S and FREON ® 114. Other halogenated hydrocarbon blowing agents include methylene chloride, chloroform, carbon tetrachloride ($CCl_4$), HCFC's such as dichlorotrifluoroethane (HCFC-123) ($CHCl_2CF_3$), dichlorotrifluoroethane (HCFC-123A) ($CHFClCClF_2$), chlorotetrafluoroethane (HCFC-124) ($CHClFCF_3$), tetrafluoroethane (HFC-134A) ($CH_2FCH_3$), dichlorofluoroethane (HCFC-141B) ($CCl_2FCH_3$), chlorodifluoroethane (HCFC-142B) ($CH_3CClF_2$), difluoroethane (HFC-152A) ($CH_3CHF_2$) the like. Other blowing agents contemplated for use in the present invention are: acetone, alcohols having from 1 to 5 carbon atoms such as isopropanol, halogenated alcohols such as fluoroisopropanol, carbon dioxide, nitrogen, water, methylethyl ketone, ethyl acetate or mixtures of any of the foregoing.

The particulate thermoplastic resin impregnated with a blowing agent is then coated with an effective amount of a very high frequency energy absorbing organic material or its water solution or organic material coated on a substrate. Any method of mixing the very high frequency energy absorbing organic material and particulate thermoplastic resin to insure a substantially even coating of the very high frequency absorbing material on the surface of the thermoplastic resin particles is contemplated. Such methods are known to those skilled in the art and may include tumbling, stirring or a Banbury mixer.

A wide variety of very high frequency energy absorbing organic materials are contemplated by the present invention. Preferred are alkanolamines, such as triethanolamine, tripropanolamine, monohydroxyamines, and dihydroxyamines; alkyl glycols such as 2-hydroxyethyl ether; and polyalkyleneglycols such as polyethylene glycol; or their water solution. It is also preferred that the organic material or its water solution has a boiling point of at least that of the expandable particle impregnated with the blowing agent.

In another embodiment, wherein radio frequency energy is employed as the very high frequency energy it is also contemplated that the very high frequency energy absorbing material may comprise an organic material coated on a substrate. The substrate may comprise another organic material or it may comprise an inorganic material. Preferably the inorganic substrate may comprise metals such as aluminum, metal oxides such as iron oxide and zinc oxide, aluminum silicates such as bentonite and clays, fly-ash and carbon. There are also commercially available sensitizers such as Frequon ® B-20 and Frequon ® B-31.

The coated thermoplastic resin particles are then delivered to a very high frequency energy transparent vessel or mold; and expanded with very high frequency energy, sufficient to fuse the particles. Typically the very high frequency energy comprises either radio frequency or microwave energy.

Microwave energy is that portion of the electromagnetic spectrum lying between the far infrared and conventional radio frequency portion. While the microwave region is not bounded by definition it is commonly regarded as extending from 300,000 megacycles to 1,000 megacycles (1 mm to 30 cm in wavelength). In most areas of the world certain frequencies have been assigned for industrial uses of microwave energy. For example, in the United States the assigned frequencies are 915 and 2,450 megahertz (MH$_z$), in Europe assigned frequencies are 896 and 2,450 MH$_z$, and in Japan 40 to 50 MH$_z$. When a material capable of absorbing microwave energy, rather than reflecting the same or being transparent thereto, is treated with microwave energy, heat is produced as a result of the absorption of the microwave energy.

Similarly, any suitable apparatus known to those skilled in the art which emits energy within the radio frequency domain may be employed to foam and fuse the expandable thermoplastic resin particles of the present invention. Typically the radio frequency domain lies between 3 and 300 MHz.

It is also contemplated herein that hot air heating, hot water or steam heating may be combined with the heating by very high frequency energy.

In another embodiment of the present invention, the thermoplastic resin particles impregnated with blowing agent may be pre-expanded to low density prior to coating the thermoplastic resin particles with the very high frequency energy absorbing material or its water solution or organic material coated on a substrate. Pre-expansion may be carried out by any method known to those skilled in the art. Preferred are steam heating, hot water heating or heating with hot air.

It is further contemplated by the present invention to pre-expand the particles after the coating step. The coated thermoplastic resin particles may be pre-expanded with steam heating, heating with hot air, hot water heating, high frequency energy or with very high frequency energy sufficient to pre-expand the particles but not cause substantial fusion to occur.

Furthermore, the present invention provides foamed articles produced by the process of the present invention. Such articles have excellent structural integrity by virtue of the excellent fusion provided by the very high frequency energy heating of the present invention.

It is further contemplated that the thermoplastic resin of the present invention also may comprise various additives, if desired. These include stabilizers for thermal and color stability, antioxidants, flame retardants, processing aids and plasticizers, extending fillers, pigments, impact modifiers, mixtures thereof and the like. Each of these may be utilized to a greater or lesser extent depending on the required final properties desired in the foamed article product.

DESCRIPTION OF THE PREFERRED EMBODIMENTS

The following specific examples illustrate the present invention. However, they are not to be construed to limit the claims in any manner whatsoever.

EXAMPLES 1-5

A Sharp Carousel II microwave oven is installed in the laboratory. This unit has a power output of 700 watts and operates at a frequency of 2450 megacycles per second. This microwave oven is used to fuse expandable bead foam in a blow-molded part. Expandable polystyrene is pre-expanded in a 100° C. oven for four minutes to a bulk density of 3 lb./cu.ft. The pre-expanded beads are mixed with various amounts of a solution comprising 50/16.67/16.67/16.67 parts by weight of water/triethanolamine/2-hydroxyethyl ether/polyethylene glycol and tumbled to insure even coating of all the beads. The coated beads are placed in an eight ounce polypropylene bottle with a screw cap and a vent hole to allow any steam generated to escape. The filled bottles are subjected to microwave energy for a maximum of ten minutes. The results are listed below in Table I.

TABLE 1

| Examples | Grams EPS in bottle | Amount Coating Solution (Percent by Weight of expanded bead) | Time in Microwave | Observations |
|---|---|---|---|---|
| 1A* | 23.25 | 1 | 10 min. | No Fusion |
| 1 | 22.55 | 2 | 10 min. | Good Fusion |
| 2 | 22.86 | 4 | 10 min. | Excellent Fusion |
| 3 | 22.81 | 6 | 6 min. | Excellent Fusion |
| 4 | 22.45 | 8 | 5 min. | Excellent Fusion |
| 5 | 22.16 | 10 | 4 min. | Excellent Fusion |

\* = Comparative Example
EPS = Expandable polystyrene

These results show that expandable polystyrene can be fused in four minutes using a 10:1 bead to solution ratio and that good fusion is possible using a 2 percent coating in 10 minutes.

EXAMPLES 6-11

The procedure of Example 1 is repeated except various amounts of a solution comprising 33.3/33.3/33.3 parts by weight of triethanolamine/2-hydroxyethyl ether/polyethylene glycol is employed as the coating. The results are set forth in Table 2 below.

TABLE 2

| Example | Grams EPS in bottle | Amount Coating Sol'n (Percent by Weight of expanded bead) | Time in Microwave (Minutes) | Observations |
| --- | --- | --- | --- | --- |
| 6 | 23.72 | 1 | 10 | 95% Fusion |
| 7 | 23.80 | 2 | 9 | Good Fusion |
| 8 | 24.34 | 4 | 6 | Good Fusion with some shrinkage |
| 9 | 24.01 | 6 | 5 | Excellent Fusion |
| 10 | 23.67 | 8 | 3 | Good Fusion |
| 11 | 24.21 | 10 | 2 | 80-85% Fusion |

These results show that with a 10:1 bead to L solution ratio, expandable polystyrene can be fused in 2-3 minutes.

EXAMPLES 12-16

The procedure of Example 1 is repeated using varying amounts of triethanolamine as the microwave absorber. The results are set forth in Table 3 below.

TABLE 3

| Example | Grams EPS | Amount Coating Sol'n (Percent by Weight of expanded bead) | Microwave Time (Minutes) | Observations |
| --- | --- | --- | --- | --- |
| 12 | 23.50 | 2 | 10 | 20-25% Fusion |
| 13 | 23.93 | 4 | 10 | Good Fusion |
| 14 | 23.17 | 6 | 9 | Excellent Fusion but 75% shrinkage |
| 15 | 23.32 | 8 | 6 | Excellent Fusion but 75% shrinkage |
| 16 | 23.47 | 10 | 1.33 | Excellent Fusion |

Using triethanolamine as the microwave absorbing solution, the time needed to fuse polystyrene can be decreased to one minute twenty seconds.

EXAMPLES 17-22

The procedure of Example 1 is repeated employing varying amounts of 2-hydroxyethyl ether as the microwave absorbing material. The results are set forth in Table 4 below.

TABLE 4

| Example | Grams EPS | Amount Coating Sol'n (Percent by Weight of expanded bead) | Microwave Time (Minutes) | Observations |
| --- | --- | --- | --- | --- |
| 17 | 23.31 | 1 | 10 | 75-80% Fusion |
| 18 | 23.21 | 2 | 9 | Good Fusion with some shrinkage |
| 19 | 22.48 | 4 | 6 | Good Fusion |
| 20 | 23.69 | 6 | 5 | Good Fusion but 20% shrinkage |
| 21 | 23.28 | 8 | 3.5 | Excellent Fusion |
| 22 | 22.92 | 10 | 2 | Excellent Fusion |

Table 4 shows that foamed articles of the present invention are readily prepared using 2-hydroxyethyl ether as the microwave absorbing material.

EXAMPLES 23-24

The procedure of Example 1 is repeated except the thermoplastic resin particles are a 50/50 blend of polyphenylene ether and polystyrene pre-expanded to 6 lb/cu.ft. The microwave absorber solution employed is a varied mixture of water and triethanolamine. The weight ratio of beads to solution is kept constant at 10:1. The results are set forth in Table 5 below.

TABLE 5

| Example | % Water | % Triethanolamine | Microwave Time (min.) |
| --- | --- | --- | --- |
| 23 | 10 | 90 | 2.75-3 |
| 24 | 20 | 80 | 3.25-3.5 |

From the results shown above, a mixture of 10% water and 90% triethanolamine provides excellent microwave fusion in less than 3 minutes for PPO/PS.

EXAMPLE 25

The procedure of Example 1 is repeated employing thermoplastic resin beads comprising a 50/50 blend of polyphenylene ether and polystyrene which are pre-expanded to 4 lb./cu.ft. The weight ratio of pre-expanded beads to microwave absorbing solution is decreased to 4:1. The microwave absorbing solution is comprised of 10% water and 90% triethanolamine. The microwave time to give excellent fusion is found to be 1.5 minutes.

EXAMPLE 26

The general procedure of Example 1 is repeated without pre-expansion. A 50/50 blend of polyphenylene ether and polystyrene imbibed with pentane and coated with a microwave absorber consisting of 10 percent water and 90 percent triethanolamine in a 4:1 bead to solution weight ratio is employed. Thirty (30) grams of coated beads are placed in an eight ounce polypropylene bottle and submitted to microwave energy to achieve a final density of 4 lb/ft³. It is found that 55 seconds of microwave energy gives excellent fusion throughout the bottle without deformity of the bottle. Two samples are cut from the fused material, one from the bottom and one from the top to compare the density of the material through the bottle. The bulk density of the bottom portion is 4.0 lb/ft³ and from the top portion is 4.6 lb/ft³, representing a good density gradient.

EXAMPLES 27-31

The general procedure of Example 1 is followed, using as the molds a blow molded Noryl ® knee bolster approximately 19"×10"×6" and an eight ounce polypropylene bottle. The microwave absorbing solution is a mixture of 10 weight percent water and 90 weight percent triethanolamine. The microwave employed is an industrial microwave having a power output of 7.5 kW. The results are set forth below in Table 6 below.

TABLE 6

| Example | Parts Used | Percent Microwave Absorber | Microwave Time (Minutes) | Observations |
|---|---|---|---|---|
| 27 | bottle | 25 | 0.5 | Excellent Fusion with split bottle |
| 28 | bottle | 25 | 0.33 | Excellent Fusion |
| 29 | knee bolster | 25 | 2 | Excellent Fusion with deformity of knee bolster |
| 30 | knee bolster | 25 | 1.5 | Excellent Fusion with some deformity |
| 31 | knee bolster | 25 | 1.33 | Excellent Fusion with min deformity |

EXAMPLE 32

23.47 g of expandable polystyrene beads pre-expanded to 4 lb/ft$^3$ and 2.35 g of triethanolamine are placed in a 250 ml polypropylene bottle with a screw cap. The cap has a 3/16 inch hole drilled in it for venting. The mixture is tumbled well to coat all of the beads. The bottle is then subjected to microwave energy in a commercial microwave for 1 minutes and 20 seconds. After the bottle cooled, it is cut in half to observe the fusion. All of the beads fused except a small amount on the walls.

COMPARATIVE EXAMPLES A-C

The general procedure described in Nazar et al., U.S. Pat. No. 4,765,934 is followed. A 50/50 blend of polyphenylene ether/polystyrene (PPE/PS) is imbibed with pentane at 95° C. for 1 hours and then 140° C. for 4 hours to give expandable PPE/PS beads. The beads are then pre-expanded in a 110° C. hot air oven for 3 minutes to a pre-expansion bulk density of 4 lb/ft$^3$. A solution of 100 parts of water and 28 parts sodium chloride (stated as the best coating solution in the Nazar et al. patent) is prepared. The beads are coated with the solution in a 2:1 bead to solution weight ratio and tumbled to insure even coating. Eight ounce polypropylene bottles with screw cap tops are filled with the coated pre-expanded beads. A hole is drilled in the cap of the bottles for venting of any steam created during the fusion process. The filled bottles are subjected to microwave energy generated by a Sharp Carousel II microwave oven for various times. The results are set forth in Table 7 below.

TABLE 7

| Example | % Salt Solution | Time in Oven (Minutes) | Observations |
|---|---|---|---|
| A* | 50 | 3 | Good fusion but some voids possibly due to water boiling |
| B* | 50 | 2.75 | Same as 3 minute sample |
| C* | 50 | 2.50 | Very poor fusion |

As can be seen from Table 7 above, the best fusion obtainable in the shortest amount of time was when the bottle was in the oven for 2.75 minutes. These results can be compared to the results from Example 26 in which PPO/PS was expanded and fused to 4 lb./cu.ft. in one step subjecting it to microwaves for 55 seconds and had excellent fusion. The fusion for the sample using the salt solution may have been inhibited by the solution boiling, as its boiling point is below the softening temperature of the PPO/PS or the solution could not bring the PPO/PS to the desired temperature for the best fusion.

COMPARATIVE EXAMPLES D-G

The general procedure described in Edberg et al., U.S. Pat. No. 3,242,238 is followed. A 50/50 PPE/PS blend is imbibed with pentane and pre-expanded as described in Comparative Example A. A solution comprising of 100 parts by weight of water and 0.3 parts by weight of sodium dodecylbenzene sulfonate (stated as the best coating in the Edberg patent) is prepared to coat the pre-expanded beads. The beads are coated with the solution in a 25:7 bead to solution ratio and tumbled to insure even coating. Eight ounce polypropylene bottles with screw caps are filled with the coated pre-expanded beads and holes are drilled in the tops of the caps to allow venting of any steam created during heating. The filled bottles are subjected to microwave energy for various amounts of time and the results are set forth in Table 8 below.

TABLE 8

| Example | Bead to Solution Ratio | Time in Oven (Minutes) | Observations |
|---|---|---|---|
| D* | 25:7 | 3 | No Fusion - water boiling out top |
| E* | 25:7 | 4 | Same as 3 min. |
| F* | 25:7 | 5 | Approximately 20% fusion but very poor |
| G* | 25:7 | 7 | Possibly 25% fusion but very poor |

Table 8 above demonstrates that good fusion is not obtainable in an economical amount of time with microwave energy using this coating solution. The solution may be much more suitable for use with a heat generator operating at 70 megacycles per second as described in the Edberg patent instead of microwave energy.

EXAMPLES 33-35

Expandable polymeric beads containing 50 parts by weight polyphenylene ether, 50 parts by weight polystyrene and 8 parts by weight pentane are added to a glass petri dish. An antistatic liquid is sprayed on the beads to enhance the surface coating of the particles. Various amounts of a radio frequency activator, Frequon ®, is added to the petri dish and mixed with the beads. The beads are then heated in a radio frequency oven and expansion of the beads is observed. The results are set forth in Table 9.

TABLE 9

| Example | Weight Of Beads (g) | Activator (Frequon ®) | Weight of Activator (g) | Time to Fill Petri Dish sec |
|---|---|---|---|---|
| 33 | 4.25 | B-20 | 0.44 | 8 |

TABLE 9-continued

| Example | Weight Of Beads (g) | Activator (Frequon ®) | Weight of Activator (g) | Time to Fill Petri Dish sec |
|---|---|---|---|---|
| 34 | 4.25 | B-31 | 0.35 | 10 |
| 35 | 4.25 | B-20 | surface coating only | 30 |

Table 9 above shows that excellent expansion of beads results when a very high frequency energy absorbing organic material coated on a substrate is employed with radio frequency energy.

EXAMPLE 36

The procedure of Example 33 is repeated except an aluminum plate is placed on top of the beads to determine if heating expandable beads in an aluminum mold is possible. No noticeable effect of the aluminum plate on heating the beads is observed.

The above-mentioned patents, patent applications and publications are incorporated herein by reference.

Many variations of the present invention will suggest themselves to those skilled in the art in light of the above-detailed description. For example, instead of Noryl ® any polyphenylene ether resin may be employed, such as poly(2,6-dimethyl-co-2,3,6-trimethyl-1,4-phenylene)ether. Further, it is contemplated that a wide range of thermoplastic resins may be used, e.g., principally atactic polystyrene, poly(alpha-methylstyrene), poly(nuclear-methylstyrene), poly(para-methylstyrene), poly(para-tert-butylstyrene), poly(chlorostyrene), poly(dichlorostyrene), poly(bromostyrene), poly(dibromostyrene), styrene-maleic anhydride copolymer, styrene-acrylonitrile copolymer, acrylonitrile-butadiene-styrene terpolymer (ABS), styrene-divinyl benzene copolymer, polycarbonates, polyethylene, polypropylene, polyamides, polysulfones, polyethersulfones, poly(etherimides), poly(etherimide esters), polyesters, and mixtures and copolymers thereof. Also useful in the present invention are a wide variety of blowing agents other than n-pentane. For instance, it is within the scope of the present invention to employ agents such as isopentane, neopentane, cyclopentane, butane, isobutane, pentene, hexane, heptane, octane, propane, methylene chloride, chloroform, carbon tetrachloride, trichlorofluoromethane ($CCl_3F$), dichlorodifluoromethane ($CCl_2F_3$), chlorodifluoromethane ($CHClF_2$), $CClF_2$-$CClF_2$, HCFC-123, HCFC-123A, HCFC-124, HFC-134A, HCFC-141B, HCFC-142B, HFC-152A, acetone, alcohols having from 1 to 5 carbon atoms, halogenated alcohols such as fluoroisopropanol, carbon dioxide, nitrogen, methylethyl ketone, ethyl acetate, water, air and mixtures of any of the foregoing. The very high frequency energy absorbing organic material may further comprise any alkanolamine, alkyl glycol, or polyalkylene glycol, mixtures thereof or their water solutions or coated on substrates, including tripropanolamine, monohydroxyamines and dihydroxyamines. All such obvious modifications are with the full intended scope of the appended claims.

We claim:

1. A process for producing a foamed thermoplastic resin article from expandable thermoplastic resin beads comprising:
(a) providing a thermoplastic resin in particulate form impregnated with a blowing agent;
(b) coating the particulate thermoplastic resin with an effective amount of a very high frequency energy absorbing organic material or its water solution or organic material coated on a substrate selected from the group consisting of alkanolamines, alkyl glycols and polyalkylene glycols or the water solutions or coatings on a substrate thereof;
(c) delivering the coated particles to a very high frequency energy transparent vessel; and
(d) expanding said coated particles with very high frequency energy sufficient to fuse the coated particles.

2. A process as defined in claim 1 wherein step (a) also comprises pre-expanding the particulate thermoplastic resin to low density.

3. A process as defined in claim 2 wherein said pre-expansion is carried out with steam heating, hot air, hot water, high frequency energy or very high frequency energy.

4. A process as defined in claim 1 wherein said thermoplastic resin is selected from the group consisting of a polyphenylene ether, an alkenyl aromatic polymer or copolymer, a polycarbonate, a polyamide, a polysulfone, a polyethersulfone, a polyester, a poly(etherimide), a poly(etherimide ester), a polyethylene, a polypropylene, an acrylonitrile-butadiene-styrene terpolymer and mixtures and copolymers of any of the foregoing.

5. A process as defined in claim 4 wherein said thermoplastic resin comprises a polyphenylene ether.

6. A process as defined in claim 5 wherein said polyphenylene ether comprises poly(2,6-dimethyl-1,4-phenylene)ether, poly(2,3,6-trimethyl-1,4-phenylene) ether, poly(2,6-diemthyl-co-2,3,6-trimethyl-1,4-phenylene) ether or a mixture of any of the foregoing.

7. A process as defined in claim 6 wherein said polyphenylene ether comprises poly(2,6-dimethyl-1,4-phenylene)ether.

8. A process as defined in claim 4 wherein said thermoplastic resin comprises an alkenyl aromatic polymer or copolymer.

9. A process as defined in claim 8 wherein said alkenyl aromatic polymer or copolymer is selected from the group consisting of principally atactic polystyrene, high impact polystyrene, poly(alpha-methylstyrene), poly(nuclear-methylstyrene), poly(para-methylstyrene), poly(para-tert-butylstyrene), a halogenated polystyrene, styrene-maleic anhydride copolymer, an acrylonitrile-butadiene-styrene terpolymer and mixtures and copolymers of any of the foregoing.

10. A process as defined in claim 9 wherein said alkenyl aromatic polymer comprises principally atactic polystyrene.

11. A process as defined in claim 9 wherein said alkenyl aromatic polymer comprises high impact polystyrene.

12. A process as defined in claim 1 wherein said thermoplastic resin comprises a polyphenylene ether/polystyrene resin blend.

13. A process as defined in claim 12 wherein said polyphenylene ether/polystyrene resin blend comprises from about 1 to about 99 parts by weight polyphenylene ether resin and from about 99 to about 1 part by weight polystyrene resin based on 100 parts by weight of the combined resins.

14. A process as defined in claim 13 wherein said polyphenylene ether/polystyrene resin blend comprises from about 20 to about 80 parts by weight polyphenylene ether resin and from about 80 to about 20 parts by weight polystyrene resin based on 100 parts by weight of the combined resins.

15. A process as defined in claim 1 wherein said blowing agent comprises a volatile liquid or gas capable of being absorbed by the thermoplastic resin and which will vaporize at or below the glass transition temperature of the thermoplastic resin.

16. A process as defined in claim 15 wherein said blowing agent is selected from the group consisting of n-pentane, neopentane, cyclopentane, butane, isobutane, pentene, hexane, heptane, octane, propane, methylene chloride, chloroform, carbon tetrachloride, trichlorofluoromethane ($CCl_3F$), dichlorodifluoromethane ($CCl_2F_2$), chlorodifluoromethane ($CHClF_2$), $CClF_2$-$CClF_2$, HCFC-123, HCFC-123A, HCFC-124, HFC-134A, HCFC-141B, HCFC-142B, HFC-152A, acetone, alcohols having from 1 to 5 carbon atoms, halogenated alcohols, carbon dioxide, nitrogen, methylethyl ketone, ethyl acetate, water, air and mixtures of any of the foregoing.

17. A process as defined in claim 16 wherein said blowing agent comprises n-pentane, isopentane, neopentane, cyclopentane or a mixture of any of the foregoing.

18. A process as defined in claim 16 wherein said blowing agent is selected from the group consisting of HCFC-22, HCFC-124, HCFC-123A, HCFC-124, HFC-134A, HCFC-141B, HCFC-142B, HFC-152A or a mixture of any of the foregoing.

19. A process as defined in claim 1 wherein said blowing agent comprises from about 2 to about 20 parts by weight based on 100 parts by weight of the thermoplastic resin.

20. A process as defined in claim 1 wherein said organic material comprises a solution of water/triethanolamine/2-hydroxyethyl ether/polyethylene glycol.

21. A process as defined in claim 1 wherein said organic material is selected from the group consisting of triethanolamine, tripropanolamine, monohydroxyamine, dihydroxyamine, their water solutions or coatings on a substrate and mixtures thereof.

22. A process as defined in claim 1 wherein said organic material comprises 2-hydroxyethyl ether or its water solution.

23. A process as defined in claim 1 wherein said organic material or its water solution or organic material coated on a substance has a boiling point of at least the TG of the expandable particle impregnated with blowing agent.

24. A process as defined in claim 1 wherein said very high frequency energy comprises microwave energy.

25. A process as defined in claim 24 wherein said microwave energy comprises frequencies ranging from about 40 MHz to about 2450 MHz.

26. A process as defined in claim 1 wherein said very high frequency energy comprises radio frequency energy.

27. A foamed thermoplastic article produced from expandable thermoplastic resin beads by a process comprising:
(a) providing a thermoplastic resin in particulate form impregnated with a blowing agent;
(b) coating the particulate thermoplastic resin with an effective amount of a very high frequency energy absorbing material or its water solution or organic material coated on a substrate selected from the group consisting of alkanolamines, alkyl glycols, and polyalkylene glycols or the water solutions or coatings on a substrate thereof;
(c) delivering the coated particles to a very high frequency energy transparent vessel; and
(d) expanding said coated particles with very high frequency energy sufficient to fuse the coated particles.

28. A foamed article producted by the process as defined in claim 27 wherein step (a) also comprises pre-expanding the particulate thermoplastic resin to low density.

29. A foamed article produced by the process as defined in claim 28 wherein said pre-expansion is carried out with steam heating, hot air, hot water, high frequency energy or very high frequency energy.

30. A foamed article produced by the process as defined in claim 27, wherein said thermoplastic resin is selected from the group consisting of a polyphenylene ether, an alkenyl aromatic polymer or copolymer, a polycarbonate, a polyamide, a polysulfone, a polyethersulfone, a polyester, a poly(etherimide), a poly(etherimide ester), a polyethylene, a polypropylene, an acrylonitrile-butadiene-styrene terpolymer and mixtures and copolymers of any of the foregoing.

31. A foamed article produced by the process as defined in claim 30 wherein said thermoplastic resin comprises a polyphenylene ether.

32. A foamed article produced by the process as defined in claim 31 wherein said polyphenylene ether comprises poly(2,6-dimethyl-1,4-phenylene)ether, poly(2,3,6-trimethyl-1,4-phenylene)ether, poly(2,6-dimethyl-co-2,3,6-trimethyl-1,4-phenylene)ether or a mixture of any of the foregoing.

33. A foamed article produced by the process as defined in claim 32 wherein said polyphenylene ether comprises poly(2,6-dimethyl-1,4-phenylene)ether.

34. A foamed article produced by the process as defined in claim 30 wherein said thermoplastic resin comprises an alkenyl aromatic polymer or copolymer.

35. A foamed article produced by the process as defined in claim 34 wherein said alkenyl aromatic polymer or copolymer comprises principally atactic polystyrene, high impact polystyrene, poly(alpha-methylstyrene), poly(nuclear-methylstyrene), poly(para-methylstyrene), poly(para-tert-butylstyrene), a halogenated polystyrene, styrene-maleic anhydride copolymer, acrylonitrile-butadiene-styrene terpolymer or mixtures and copolymers of any of the foregoing.

36. A foamed article produced by the process as defined in claim 35 wherein said alkenyl aromatic polymer comprises principally atactic polystyrene.

37. A foamed article produced by the process as defined in claim 35 wherein said alkenyl aromatic polymer comprises high impact polystyrene.

38. A foamed article produced by the process as defined in claim 27, wherein said thermoplastic resin comprises a polyphenylene ether/polystyrene resin blend.

39. A foamed article produced by the process as defined in claim 38 wherein said polyphenylene ether/polystyrene resin blend comprises from about 1 to about 99 parts by weight polyphenylene ether resin and from about 99 to about 1 part by weight polystyrene resin based on 100 parts by weight of the combined resins.

40. A foamed article produced by the process as defined in claim 39 wherein said polyphenylene ether/polystyrene resin blend comprises from about 20 to about 80 parts by weight polyphenylene ether resin and from about 80 to about 20 parts by weight polystyrene resin based on 100 parts by weight of the combined resins.

41. A foamed article produced by the process as defined in claim 27 wherein said blowing agent comprises a volatile liquid or gas capable of being absorbed by the thermoplastic resin and which will vaporize at or below the glass transition temperature of the thermoplastic resin.

42. A foamed article produced by the process as defined in claim 41 wherein said blowing agent is selected from the group consisting of n-pentane, isopentane, neopentane, cyclopentane, butane, isobutane, pentene, hexane, heptane, octane, propane, methylene chloride, chloroform, carbon tetrachloride, trichlorofluoromethane ($CCl_3F$), dichlorodifluoromethane ($CCl_2F_2$), chlorodifluoromethane ($CHClF_2$), $CClF_2$ - $CClF_2$, HCFC-123, HCFC-123A, HCFC-124, HFC-134A, HCFC-141B, HCFC-142B, HFC-152A, acetone, alcohols having from 1 to 5 carbon atoms, carbon dioxide, nitrogen, water, air and mixtures of any of the foregoing.

43. A foamed article produced by the process as defined in claim 42 wherein said blowing agent comprises n-pentane, isopentane, neopentane, cyclopentane or a mixture of any of the foregoing.

44. A foamed article produced by the process as defined in claim 43 wherein said blowing agent comprises HCFC-22, HCFC-123, HCFC-123A, HCFC-124, HFC-134A, HCFC-141B, HCFC-142B, HFC-152A or a mixture of any of the foregoing.

45. A foamed article produced by the process as defined in claim 28 wherein said blowing agent comprises from about 2 to about 20 parts by weight based on 100 parts by weight of the thermoplastic resin.

46. A foamed article produced by the process as defined in claim 27 wherein said organic material comprises a solution of water/triethanolamine/2-hydroxyethyl ether/polyethylene glycol.

47. A foamed article produced by the process as defined in claim 27 wherein said organic material comprises triethanolamine, tripropanolamine, monohydroxyamine, dihydroxyamine, their water solutions or coatings on a substrate and mixtures thereof.

48. A foamed article produced by the process as defined in claim 27 wherein said organic material comprises 2-hydroxyethyl ether or its water solution.

49. A foamed article produced by the process as defined in claim 27 wherein said organic material or its water solution or organic material coated on a substrate has a boiling point of at least the $T_g$ of the expandable particle impregnated with blowing agent.

50. A foamed article produced by the process as defined in claim 27 wherein said very high frequency energy comprises microwave energy.

51. A foamed article produced by the process as defined in claim 50 wherein said microwave energy comprises frequencies ranging from about 40 MHz to about 2450 MHz.

52. A foamed article produced by the process as defined in claim 27 wherein said very high frequency energy comprises radio frequency energy.

* * * * *